May 8, 1934.  R. C. THOMPSON  1,957,681
APPARATUS FOR MEASURING FLUID FLOW
Filed April 1, 1931    2 Sheets-Sheet 1
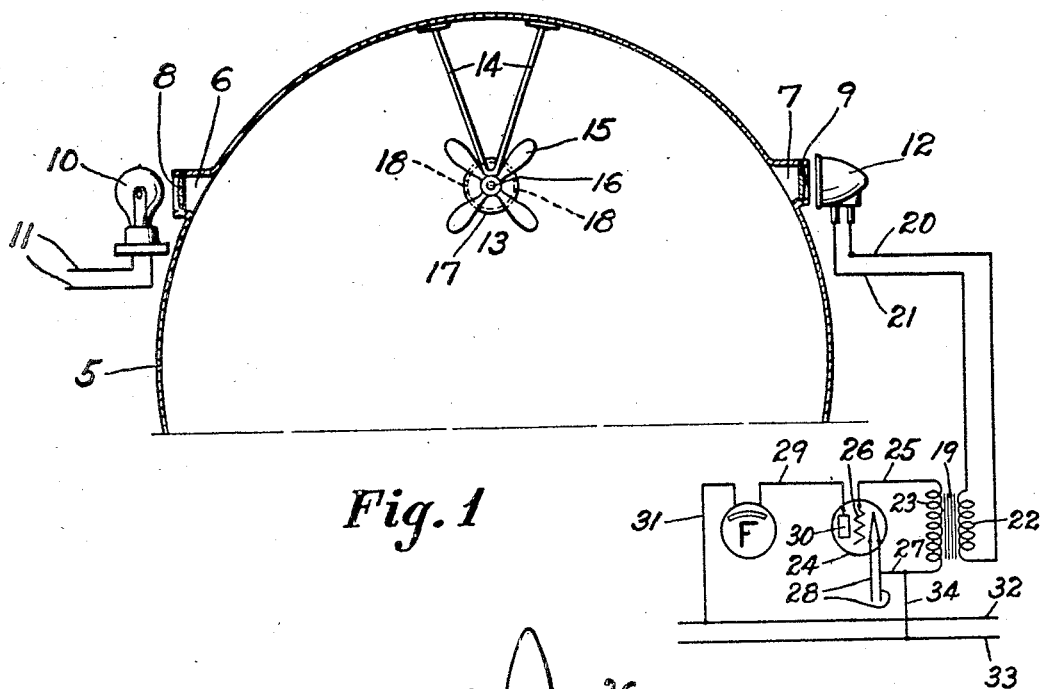
*Fig. 1*
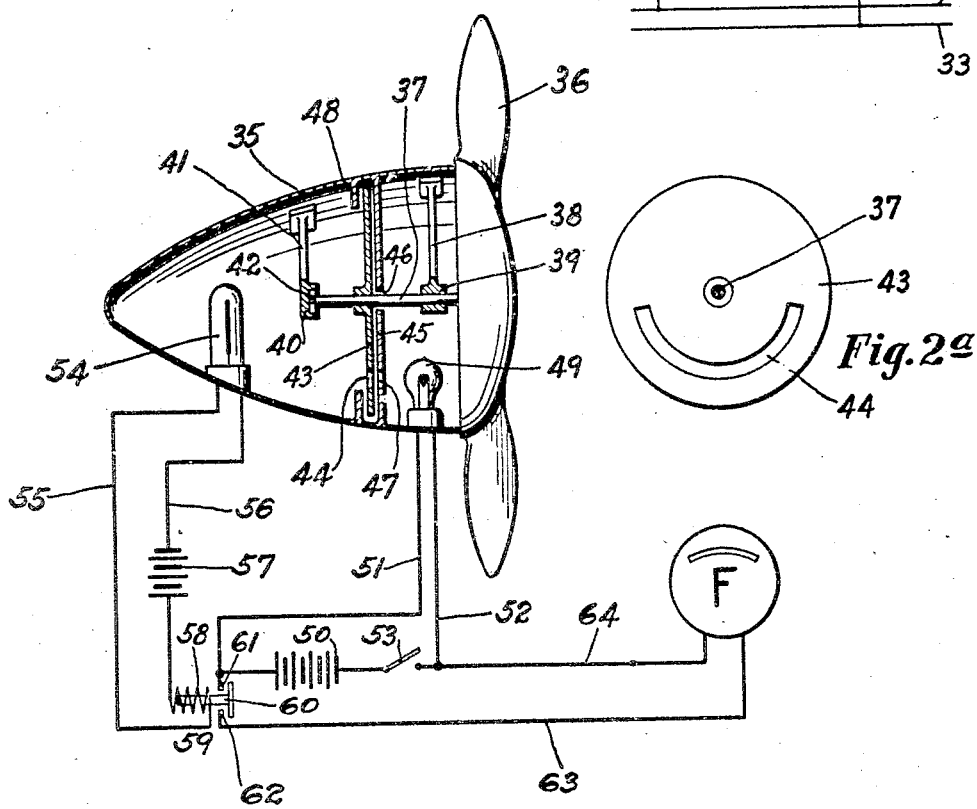
*Fig. 2*   *Fig. 2ª*
INVENTOR
Richard C. Thompson
BY Synnestvedt + Lechner
ATTORNEYS May 8, 1934.  R. C. THOMPSON  1,957,681
APPARATUS FOR MEASURING FLUID FLOW
Filed April 1, 1931   2 Sheets-Sheet 2
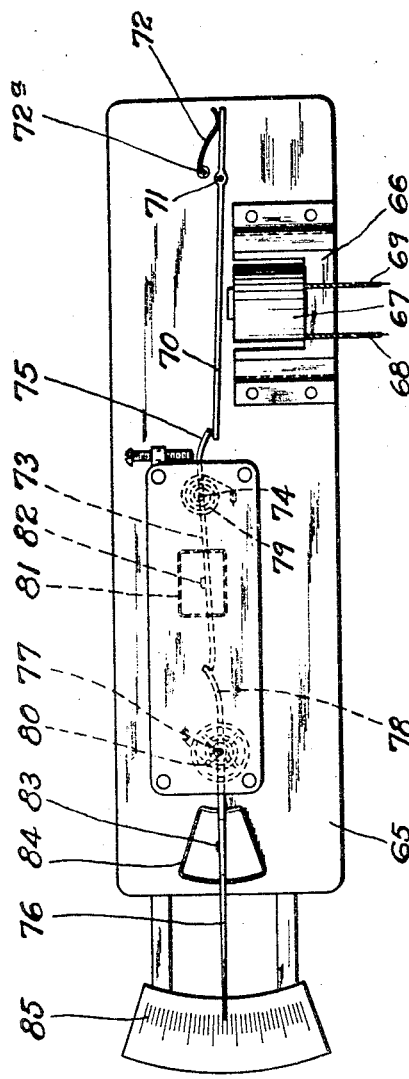
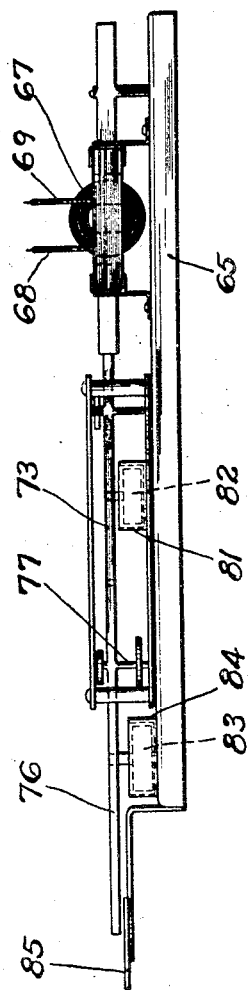
INVENTOR
Richard C. Thompson
BY
Symestvedt + Lechner
ATTORNEYS Patented May 8, 1934

1,957,681

UNITED STATES PATENT OFFICE 1,957,681

APPARATUS FOR MEASURING FLUID-FLOW

Richard Cowles Thompson, Woodmont, Conn., assignor to American Transformer Company, Newark, N. J., a company of New Jersey Application April 1, 1931, Serial No. 526,809

7 Claims. (Cl. 177—311)

This invention relates to apparatus for measuring fluid-flow. It is particularly concerned with apparatus which is suitable for the measurement of a wide variety of substances which, for the purposes of the present application, may be termed "fluids". By way of further explanation, it should be noted that this term, as used herein, includes such substances as water and other liquids as well as air or other gases.

It might be noted, in addition, that the apparatus of the present invention is especially useful in connection with the measurement of gaseous substances, the reasons for which will become more apparent as this consideration proceeds;

In general, it is the object of the present invention to provide a measuring apparatus (adapted either for the measurement of relative speed or velocity or of volume), the said apparatus being simple and rugged in construction as well as efficient and accurate in operation.

Additionally, according to the present invention, an apparatus is provided for by which measurement of relative velocity or speed of gas-flow may be made accurately, regardless of the density of the gas being measured.

The nature of the foregoing objects and advantages, as well as additional objects and advantages, will appear more clearly in the following discussion of the accompanying drawings in which—

Figure 1 is a somewhat diagrammatic view illustrating one embodiment of the invention;

Figure 2 is a somewhat diagrammatic view of another embodiment of the invention;

Figure 2a illustrates a detail of the construction of Figure 2;

Figure 3 is a top plan view of a certain general type of measuring instrument or meter which I prefer to employ in combination with the structures of Figures 1 and 2; and Figure 4 is a side view of the instrument illustrated in Figure 1.

At this point it should be noted that, while I prefer to employ the type of instrument illustrated in Figures 3 and 4 in association with the structures of Figures 1 and 2, this is not essential in all cases, so that I also contemplate employing a different meter for this purpose where the circumstances or conditions make a change desirable. Furthermore, it should be observed that the structure illustrated in Figures 3 and 4 is not a part of the present invention per se, but is described herein in order to bring out certain cooperative relations existing between this instrument and the remaining structures when they are used in combination. The apparatus of Figures 3 and 4 is described and claimed in the copending application of Richard Cowles Thompson and Fullerton D. Webster, Serial No. 526,876, filed April 1st, 1931.

Figure 1 of the drawings illustrates an application of the apparatus of this invention to a gas main in order to measure the flow therethrough.

In this figure a portion of a gas main is indicated by the reference numeral 5, the showing thereof being in transverse section. At suitably arranged and oppositely disposed points, on each side of the main, I provide apertures 6 and 7 therein in which suitable closures such as the glass plates or lenses 8 and 9 are disposed. Adjacent to the glass 8 I have arranged a source of light rays such as the electric light bulb 10, connections 11 being extended therefrom to any desired source of electrical power. The use of lenses at points 8 and 9, of course, aids in concentrating the light rays passing through the main.

The openings 6 and 7 are oppositely arranged in order that light rays emitted from the bulb 10 may pass transversely through the main to a photo-electric device such as indicated at 12. I prefer to use a photo-electric device of a type or character which is adapted to produce an electric current by virtue of alterations in light rays impinging thereon.

Before proceeding with a description of the electrical connections associated with the device 12, it should be noted that a shutter mechanism indicated in general at 13 is arranged in the gas main in the path of travel of light rays therethrough. This shutter mechanism may be supported from the interior surface of the main as by means of bracket members 14. In addition, such shutter mechanism includes a fan or propeller-like device 15 which is carried by shaft 16, the latter being suitably mounted for rotation on brackets such as illustrated at 14, under the influence of relative gas-flow in the main. The shaft 16, furthermore, carries a cylindrical shutter structure 17 which is provided with diametrically opposed shutter openings 18 in the side walls thereof.

In operation, the flow of gas through the main rotates the fan structure 15, thus driving the shaft 16 and with it the cylindrical shutter 17 with the result that light rays emitted from the bulb 10 are interrupted, so to speak, passage thereof to the device 12 occurring only at the point, in the rotation of the cylinder 17, at which the shutter openings 18 come into registry with each other generally lengthwise of the path of travel of the rays.

Ordinarily, the general type of device indicated at 12 in this figure is capable of producing only a relatively small amount of current under the influence of the light rays to which it is subjected. Therefore, under the present conditions, it is desirable to amplify or increase this current by some suitable relay mechanism, although it is to be understood that where such devices are capable of producing a fairly substantial amount of current, the amplification circuits might possibly be dispensed with.

In the present showing, however, I have disclosed the use of a transformer 19, the primary coil 22 of which is indicated as connected in series with the leads 20, 21 which extend from the photo-electric device 12. It should also be understood, at this point, that the structure and mode of operation of photo-electric devices of the type above referred to is not a part of the present invention per se, so that, for present purposes, it need only be borne in mind that such a device is capable of producing an E. M. F. by virtue of the impingement of light rays thereon. The secondary coil 23 of the transformer 19 is coupled into the grid circuit of a vacuum valve device 24, the connections including wire 25 extended to the grid element 26 and wire 27 extended to one of the filament leads 28. The filament, of course, is supplied with a heating current through the leads 28 in the usual manner and from any suitable source.

The plate circuit of the valve 24 includes a connection 29 extending from the plate element 30 to an electrical impulse frequency meter or measuring device indicated in general by the reference letter F. The other connection 31 to the meter extends to one side 32 of a suitable power line 32, 33. The plate circuit, of course, is completed by means of a connection 34 extended from the other power line 33 to the connection 27 of the grid circuit and therethrough to the filament of the valve.

The general arrangement and operation of the foregoing valve circuits are, of course, well understood in this art and, therefore, need not be discussed in detail herein. However, it should be noted that I prefer to employ a thermionic valve device of a type which is capable to control, under extremely small variations in grid potential, a very large or heavy current in the plate circuit thereof. Such a valve is almost "trigger-like" in its operation, providing, in the usual construction, for the passage of a very heavy plate current upon an extremely small drop or change from a predetermined point in the grid potential.

The reason for my preference in this connection is the fact that, when associated with a measuring system or construction of the character here involved, the plate circuit of the valve may be extended to a large number of points or places in order to provide an indication by means of a metering or measuring instrument located at each one of such points. This is often desirable in measuring or metering systems for gas mains and the use of a thermionic valve device of the character above referred to is advantageous as it provides for current flow in the plate circuit which is ample or sufficient to actuate a large number of meters, even though some or all of them be located a long distance away from the actual point of measurement in the main.

A further discussion of the operation and advantages of the foregoing metering system is presented herebelow after the consideration of the measuring apparatus illustrated in Figures 3 and 4.

Turning now to the construction of Figure 2, the first point to be noted is that various features of the present invention are here illustrated as applied to an airspeed indicator adapted for use, particularly, on aircraft.

In this embodiment of the invention a casing 35, preferably of stream-line configuration, is employed for housing various parts of the apparatus as well as for mounting a propeller or fan-like device 36 which is adapted to be driven by relative air-flow upon movement of the apparatus relatively thereto. The device 36 is mounted for rotation on and with a shaft 37, the shaft being supported in the head end of the casing 35 as by means of a bracket 38 carrying a bearing 39. At the rear end of the shaft 37 I have arranged an additional bearing 40 which is supported from the inner surface of the casing 35 by means of a bracket member 41. In this connection it should be noted that in order to provide for a minimum of friction in the operation of the wind driven device 36, I preferably employ a jewel element 42 in the bearing 40, the jewel serving primarily as a thrust bearing.

The shaft 37, furthermore, carries and drives a circular shutter element 43 having a substantially semi-circular shutter opening 44 therein, disposed concentrically of and at one side of the shaft 37 (see Fig. 2a).

Adjacent the rotatable shutter 43 I have arranged a baffle element 45 disposed transversely of the casing 35 and having a central aperture 46 through which the shaft 37 extends. This baffle or shield 45, of course, is fixed in the casing 35 and is provided with an aperture or shutter opening 47 adapted to register with the shutter opening 44 of the rotatable element 43 in certain relative positions thereof. If desired, an additional fixed baffle element or shield 48 may be arranged circumferentially of the casing 35 at the opposite side of the movable part 43.

At one side of this shutter mechanism, including the parts 43, 45 and 48, I have arranged a source of light or light rays such as the electric light bulb 49 which derives its heating current from an E. M. F. source such as the battery 50, through connections 51 and 52, a suitable switch 53 being connected in this circuit.

The bulb 49 is illustrated in Figure 2 as being disposed to the forward side of the shutter mechanism although it is to be understood that the arrangement may be changed or reversed, that is, this bulb may be reversed in position with respect to the photo-electric device 54 now to be described. This photo-electric device as shown in Figure 2 may be of the selenium cell type. In the arrangement shown, the device 54 is positioned rearwardly of the shutter mechanism 43, 45 and 48, within the trailing end of the stream-line housing 35 from which connections 55 and 56 extend to a current source such as the battery 57, preferably through the windings 58 of a relay mechanism 59.

It might be noted at this point that the type of photo-electric device here shown is that which produces a variation in the flow of current from a source connected therewith by virtue of the action of light rays impinging on the light sensitive elements thereof. If desired, however, the general type of photo-electric structure illustrated in connection with other parts in Figure 1 may be substituted for the device 54 and battery 57 in the airspeed indicator of Figure 2.

The remainder of the circuits or connections associated with this construction include an armature 60 of the relay 59 which is adapted to make and break a circuit which includes contacts 61 and 62 operatively associated with the armature 60. These contacts are connected, respectively, to one side of the power source 50 and one side of a metering or measuring apparatus indicated in general by the reference letter F, the latter connection including a wire 63. The other lead 64 from the meter F extends therefrom to the connection 52 for the light bulb 49, in which the switch 53 is interposed so that upon completion of the circuits for the light bulb and the meter by closing the switch 53, the bulb as well as the meter receive an actuating E. M. F. from the battery 50.

It is preferable to provide the portion of the casing 35 in which the device 54 is positioned with a "silvered" or mirror-like inner surface in order to ensure proper action of the cell 54. This is especially desirable where the bulb 49 and the device 54 may not conveniently be positioned in direct alignment, for example, as in the streamline housing 35.

Before proceeding with a discussion of the apparatus of Figures 3 and 4, attention is called to the fact that under certain circumstances it may be found to be desirable to alter the shutter mechanisms associated with the constructions of Figures 1 and 2 in order to provide for interruption of light rays either at a higher or at a lower frequency than that effected by the apparatus as shown. Such changes, of course, may be made, for example, by utilizing a greater number of shutter apertures in various of the parts or by reducing the dimensions thereof or by altering the aerodynamical characteristics of the driving propellers.

Referring now particularly to Figures 3 and 4, I have therein illustrated an indicating apparatus including a supporting plate or base 65 of any character suitable for mounting the various parts or elements now to be described.

The apparatus includes an electromagnet or an electromagnetic device having a core, in this form, of E shape as indicated by the reference numeral 66. On the central leg of this core a suitable coil 67 is wound, the leads from the coil being indicated at 68 and 69. At this point it should be noted that the current or impulses of current produced in the circuits of Figs. 1 and 2 are fed to the coil 67 through its leads 68 and 69.

The electromagnetic device further includes an armature or vibrating member 70 which is pivoted to a fixed part as indicated at 71, so that the element 70 may be free to move toward and away from the core 66 in synchronism with the impulses or alternations of the current being measured. The outward movement of the element 70 is provided for by means of a return spring 72 which is fixed as at 72a.

The mechanism for giving a constant or continuous reading of the frequency of the current fed to the meter includes an arm or needle 73 which is pivoted as at 74 and provided with one end 75 extended to engage the element 70. At its other end the needle or member 73 is adapted to contact with a similar needle 76 which is pivoted on a shaft 77, the needle 76 being extended as indicated at 78 to engage the end of needle 73 remote from the point of engagement with the element 70.

A hair spring 79 is associated with the pivot shaft 74 of the needle 73 in such manner as to yieldingly urge the extension 75 toward the armature 70. In like manner a hair spring 80 is connected with the pivot shaft 77 of the needle 76 in order to resiliently urge its extension 78 toward the needle 73. Additionally, each of the needles 73 and 76 is provided with means for damping the movements thereof. In the case of the needle 73 a suitable receptacle or vessel 81 is arranged below the needle and adapted to contain some suitable damping liquid such as oil. Needle 73 carries a baffle element 82 which is adapted to move, with the needle, flat-wise in the oil or other liquid bath (see Fig. 4). Needle 76 carries a similar baffle or damping element 83 which is arranged for movement in liquid contained in a suitable vessel 84.

Preferably, the needle 76 is mounted in association with a graduated scale 85 which, of course, may suitably be calibrated to indicate electrical impulse frequency, or the speed or velocity of the gas or air being measured.

The operation of the above described meter need not be set forth in detail herein although it should be observed that, under the influence of the pulsating or alternating currents fed thereto from the systems of Figures 1 and 2, the armature 70 is moved or vibrated. This vibration is transmitted to the needle or arm 73 through the extension 75 thereof. In like manner, movements of the needle 73 affect the position of the needle 76 in order to obtain a substantially constant reading on the scale 85.

As brought out fully in the copending application above referred to, this constant indication results from an adjustment of the damping mechanisms and return springs associated with the needles 73 and 76 to cause movements of the needle 73 at a lower rate than those of the armature 70 as well as movements of the needle 76 at a rate lower than that of the needle 73.

It will be apparent, of course, that if desired the scale 85 may be graduated to give indications of velocity of the gas or air being measured, it being noted that changes in the relative gas or air-flow produce corresponding changes in the speed of operation of the shutter mechanisms. This change in the operation of the shutter mechanisms, in turn, directly affects the rate or frequency of impulses delivered to the frequency measuring device.

I prefer to employ the meter of Figures 3 and 4, particularly in association with the airspeed indicating mechanism of Figure 2, for the reason that this particular meter is not subject to variations or inaccuracies in reading even when located adjacent other magnetizable or magnetic structures. For example, where the apparatus is installed in the cockpit of an aircraft, the proximity thereof to the engine of the craft has no effect upon the reading afforded. In addition, this particular meter is capable of providing accurate indications or readings in spite of vibrations or movements of the structure in which it is mounted. Still further, it may be found to be desirable to employ this particular meter where the frequencies being measured are those of an interrupted alternating current, so that the meter is also well adapted for use in connection with systems of the general type above described in which an alternating current is the most convenient or the only one available for operating it.

Attention is also called to the fact that with an airspeed indicating system such as that described above in connection with Figure 2, the various parts may be so designed and arranged as to operate substantially uniformly regardless of the density of the air in which the craft is flying. That is, the wind driven propeller will rotate under the influence of a relative air-flow of given speed, at a substantially constant rate regardless of the altitude at which the aircraft is flying. This is made possible largely in view of the fact that the wind driven element need not be mechanically connected to any indicating mechanism and, therefore, may be made of such construction as will permit the use of very fine and practically frictionless supporting bearings, for example, such as the jewel bearing indicated at 42 in Figure 2.

This type of indicating mechanism, therefore, need not be adjusted in order to give accurate readings at various altitudes and, in addition, the troublesome and cumbersome multiple reading scales (for various altitudes) which have been proposed for use in connection with types of airspeed indicators heretofore employed, are completely eliminated.

In view of the foregoing it will also be apparent that local differences or changes in air pressure in the vicinity of the mounting of the wind driven fan, for example, adjacent a supporting aerofoil, will not affect the reading provided, it being noted in this connection that heretofore, with the widely used Pitot tube type of indicator, local variations in pressure, usually resulting from changes in speed of the aircraft, have resulted in very inaccurate airspeed indication.

Still further, the propeller 36 and its associated parts may be mounted as a unit at any convenient point, as on a supporting wing, from which point convenient connection may be made (by means of electrical conductors only) to an instrument or instruments located in a cockpit or cockpits of the craft.

I claim:—

1. Apparatus for measuring the velocity of flow of a gaseous fluid subject to pressure variations including propeller means actuable by the flow of the fluid to be measured, a source of energy transmittable through space, a device responsive to energy transmitted through space, said source and said device being associated with each other for transmission of energy through space from the former to the latter and the propeller means being interposed in the line of energy transmission to effect alterations in the energy transmitted at a rate proportional to the rate of actuation of the propeller means by the fluid-flow, and means associated with said device for indicating the rate of alterations to which it responds and thus the velocity of the fluid-flow.

2. Apparatus for measuring the velocity of flow of a gaseous fluid subject to pressure variations including propeller means actuable by the flow of fluid to be measured, a source of light, a photo-electric device, said source and said device being associated with each other for transmission of light from the former to the latter and the propeller means being interposed in the line of light transmission to effect alterations in the light transmitted at a rate proportional to the rate of actuation of the propeller means by the fluid-flow, and means associated with said device for indicating the rate of alterations to which it responds and thus the velocity of the fluid-flow.

3. Apparatus for measuring the velocity of flow of a gaseous fluid subject to pressure variations including propeller means actuable by the flow of fluid to be measured, shutter means associated with the propeller means and movable therewith, a source of light, a photo-electric device, said source and said device being associated with each other for transmission of light from the former to the latter and the shutter means being interposed in the line of light transmission to effect alterations in the light transmitted at a rate proportional to the rate of actuation of the propeller means by the fluid-flow, and means associated with said device for indicating the rate of alterations to which it responds and thus the velocity of the fluid-flow.

4. Apparatus for measuring the velocity of flow of a gaseous fluid subject to pressure variations including propeller means, an axis structure for the propeller means mounted to rotate therewith, shutter means mounted on the axis structure for rotation therewith, a source of light at one side of the shutter means, a photo-electric device at the opposite side of the shutter means, said source and said device being associated with each other for transmission of light from the former to the latter and the shutter means being interposed in the line of light transmission to effect alterations in the light transmitted at a rate proportional to the rate of actuation of the propeller means by the fluid-flow, and means associated with said device for indicating the rate of alterations to which it responds and thus the velocity of the fluid-flow.

5. Apparatus for measuring the velocity of flow of a gaseous fluid subject to pressure variations including propeller means actuable by the flow of the fluid to be measured, an axis structure for the propeller means rotatable therewith, a casing projecting from one side of the plane of rotation of the propeller means and enclosing the axis structure, a shutter carried by the axis structure and rotatable therewith within said casing, a source of light within the casing at one side of the shutter, a photo-electric device in said casing at the opposite side of said shutter, the shutter, source of light and photo-electric device being associated with each other and arranged in said casing for transmission of light from said source through the path of movement of the shutter to the photo-electric device to provide for alterations in the light transmitted from the source to the photo-electric device by said shutter at a rate proportional to the rate of actuation of the propeller means by the fluid-flow, and means associated with said device for indicating the rate of alterations to which it responds and thus the velocity of the fluid-flow.

6. Apparatus for measuring the velocity of flow of a gaseous fluid in a substantially closed conduit in which the fluid is subject to pressure variations including propeller means within the conduit actuable by the flow of fluid therein, a source of energy transmittable through space, a device responsive to energy transmitted through space, said device being located exteriorly of the conduit, and the source and said device further being associated with each other for transmission of energy through space from the former to the latter, the conduit being constructed to provide for substantially free transmission of energy in the line of transmission, the propeller means being interposed in said line of energy transmission to effect alterations in the energy transmitted at a rate proportional to the rate of actuation of the propeller means by the fluid-flow, and means associated with said device for indicating the rate of alterations to which it responds and thus the velocity of the fluid-flow.

7. Apparatus for measuring the velocity of flow of a gaseous fluid in a substantially closed conduit in which the fluid is subject to pressure variations including propeller means within the conduit actuable by the flow of fluid therein, a a source of light and a light responsive device positioned at opposite sides of the propeller means but exteriorly of the conduit, the conduit having means providing for the transmission of light therethrough from said source to said device to provide for alterations in the light transmitted by the propeller means at a rate proportional to the rate of actuation of the propeller means by the fluid-flow, and means associated with said device for indicating the rate of alterations to which it responds and thus the velocity of the fluid-flow.

RICHARD COWLES THOMPSON.